United States Patent [19]

Bonnes

[11] 4,050,727
[45] Sept. 27, 1977

[54] HAND-SHOVEL ASSEMBLY AND METHOD OF PRODUCING IT

[75] Inventor: David R. Bonnes, Columbus, Ohio

[73] Assignee: The Union Fork & Hoe Company, Columbus, Ohio

[21] Appl. No.: 713,113

[22] Filed: Aug. 10, 1976

[51] Int. Cl.$^2$ .............................. A01B 1/22; B25G 3/34
[52] U.S. Cl. ..................................... 294/49; 16/110 R; 294/57; 403/268; 403/334
[58] Field of Search .................... 294/49, 57; 15/145; 16/110 R; 30/340, 342–344; 76/111, 113; 145/29 R, 61 R, 61 H; 273/80.8; 403/265, 268, 269, 334, 361

[56] References Cited

U.S. PATENT DOCUMENTS

| 1,518,259 | 12/1924 | Filiatreault | 145/29 R X |
| 2,031,556 | 2/1936 | Brandenburg | 294/49 |
| 2,937,046 | 5/1960 | Olvey | 294/49 |
| 3,018,140 | 1/1962 | Portz et al. | 403/268 X |
| 3,128,131 | 4/1964 | Bianchini | 403/268 X |
| 3,175,232 | 3/1965 | Stowell | 145/29 R X |
| 3,833,037 | 9/1974 | Fish | 145/29 R |

Primary Examiner—Johnny D. Cherry
Attorney, Agent, or Firm—Wm. V. Miller

[57] ABSTRACT

A hand-shovel assembly consisting of a metal shovel head and a wooden handle, the head having a socket for receiving the end of the handle which is forced into the upper open end of the socket and is retained therein without the use of rivets, screws, or other fasteners. The handle end is retained in the socket by means of a set or cured adhesive which is inserted in a viscous state into the open lower socket end and, while still viscous, is forced around the inserted end of the handle by means of a plug of wood driven into the lower socket end.

12 Claims, 8 Drawing Figures

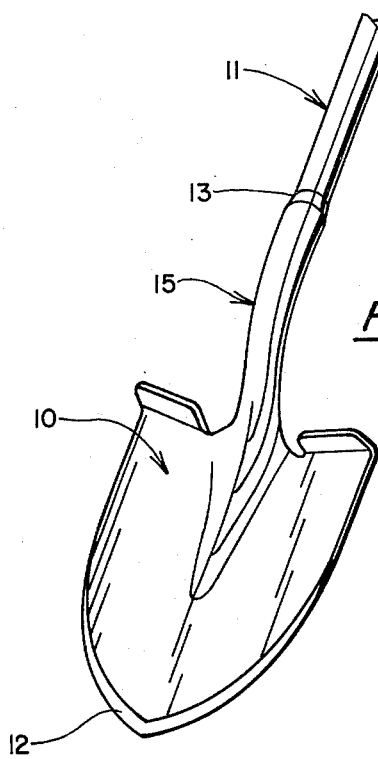
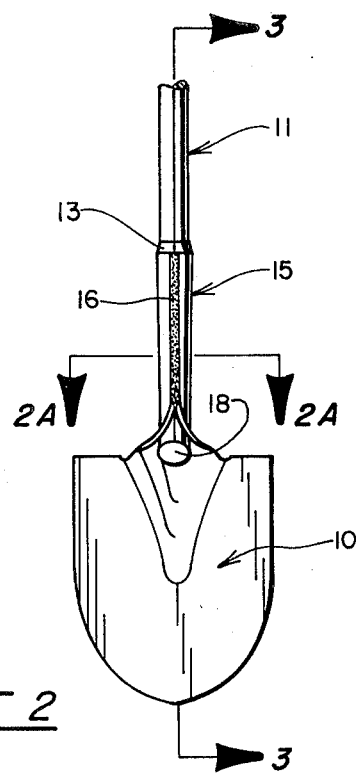
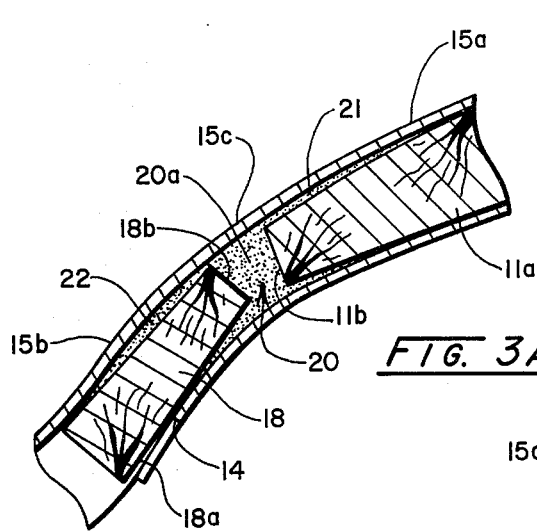
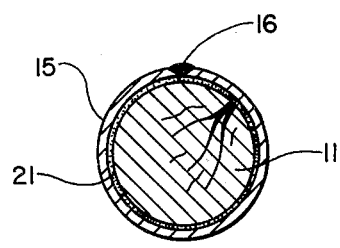
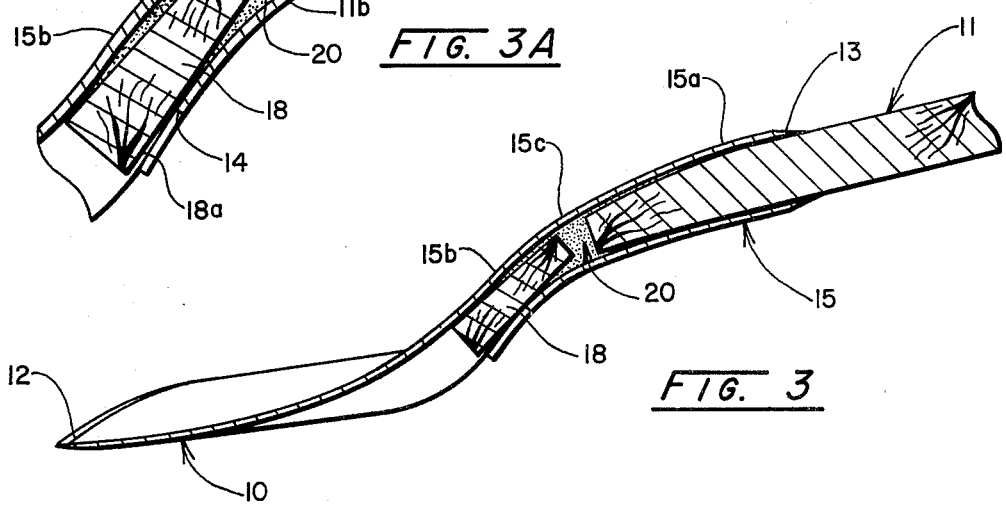

HAND-SHOVEL ASSEMBLY AND METHOD OF PRODUCING IT

BACKGROUND OF THE INVENTION

It is common to form hand shovels with a metal head and a wooden handle. The head has formed thereon a split handle-receiving socket open at both its upper and lower ends. The lower end of the handle is forced into the upper end of the socket, and is usually retained therein by rivets, screws or other fasteners, passed transversely through one or more openings in the socket wall and the inserted part of the handle. These transverse rivets, or the like, often bring about splitting or weakening of the handle, causing handle breakage or permitting loosening of the handle or complete separation from the head. Ordinarily, the head is made of steel and although it would be desirable to make it of lightweight aluminum, this has been found difficult due to the difficulty of grinding a sharp digging edge on the aluminum head and the tendency for the split socket thereon to spread when the handle is forced therein.

SUMMARY OF THE INVENTION

The present invention provides a structure and method whereby it is possible to secure the wooden handle in the socket of the shovel head without the use of rivets, screws, etc. This is accomplished by forcing the lower end of the handle into the upper end of the socket, applying a viscous adhesive through the lower end of the socket, in a substantial amount so that it accumulates at the extremity of the inserted handle end, and then driving a plug into the lower end of the socket to force the viscous adhesive between the inserted handle end and the surrounding socket wall and between the driven plug and the surrounding socket wall. This forms a substantially continuous bonded handle portion which extends completely through the socket that is retained therein by the adhesive, when it sets or cures, as well as by the plug driven into the lower end of the socket. The socket is formed as a split socket but the split is welded to produce a welded seam so that the socket will not spread when the handle end is forced therein, thus, facilitating the use of aluminum.

BRIEF DESCRIPTION OF THE DRAWINGS

The best mode contemplated for carrying out this invention is illustrated in the accompanying drawings in which:

FIG. 1 is a perspective view of the shovel assembly embodying this invention.

FIG. 2 is a rear elevational view of the shovel assembly.

FIG. 2a is an enlarged transverse sectional view taken along line 2a—2a of FIG. 2.

FIG. 3 is an axial sectional view through the assembly.

FIG. 3a is an enlargement of a portion of the assembly of FIG. 3 showing the inner end portion of the handle and the plug.

DETAILED DESCRIPTION OF THE INVENTION

Figure 4:
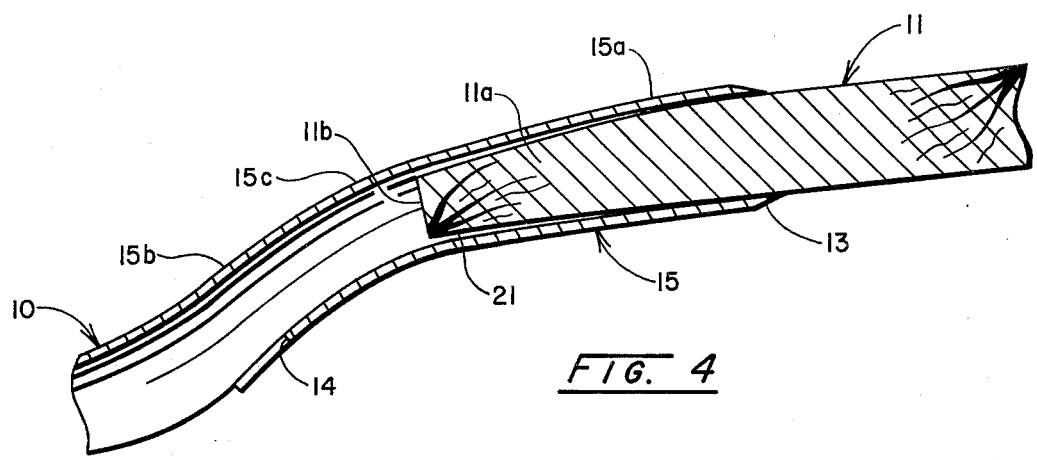
FIG. 4 is a schematic view showing the handle inserted in the upper end of the socket on the shovel head.

With specific reference to the drawings, there is illustrated one specific example of this invention. In this example, a metal head is indicated at 10 and a handle at 11. It is preferred that the head be of aluminum and the hanlde be of wood. As previously indicated, the wooden handle is attached to the head, according to this invention, without the use of rivets, screws, or other fasteners, which usually extend transversely through the wooden handle and tend to weaken it.

The shovel head is provided with a sharp leading or lower edge indicated at 12 for digging. According to this invention, this sharp tapered edge is produced by coining rather than grinding, which is very important when using aluminum for the head, due to the tendency for the aluminum to split and burr during grinding. Similarily, a sharp annular edge 13 is coined at the outer or upper extremity of the handle-receiving socket 15 is eliminate burring so as not to interfere with insertion of the handle 11. This edge is tapered outwardly and downwardly so there is no heavy shoulder at this end of the socket.

The socket 15 is formed on the back side of the head 10 and is open at both its upper and lower ends. The socket is formed as a split annular sleeve on the back, with a split extending its full length. According to this invention, this split is welded, the seam being indicated at 16. This welding is especially desirable, when the head is made of aluminum, to prevent spreading at the split when the handle is inserted into the socket.

The sleeve-like socket 15 is of substantially annular cross-section but gradually tapers from its wider upper annular end 13 to its lower annular end 14 to provide a socket which has an open upper end of greater diameter than the open lower end. It will be noted also, that the handle-receiving socket is formed with an upper substantially straight tubular section 15a and a lower substantially straight tubular section 15b which are so disposed that their axes are at an angle relatively where the two sections join at 15c.

The handle 11 is of annular cross section and has a tapered lower end portion 11a which is to be inserted in the upwardly-opening flared socket 15. The lower extremity 11b of this tapered handle portion is of lesser outside diameter than the inside diameter of the adjacent part of the socket 15 with the tapered handle 11a in its final position in the socket. With this arrangement, there is a substantially annular space around the inner portion 11a of the handle and the surrounding wall of the socket.

A tapered plug 18, also preferably of wood, of selected length, is located in the open lower end of the socket 15, being forced into the socket in a manner to be described. The inner end 18b of this plug has an outer diameter less than the inner diameter of the adjacent surrounding part of the socket 15 in its final position in the socket. The outer extremity 18a of the plug 18 has an outer diameter greater than the inner diameter of the lower end 17 of the socket. With this arrangement, there is a substantially annular space around the inner portion of the tapered plug within the surrounding wall of the socket.

Thus, the handle portion 11a and the plug 17, extend into the socket from its opposed open ends. The inner extremities 11b and 18b thereof, do not meet but there is a tubular chamber provided therebetween. This chamber communicates with the annular spaces around the respective inner portions of the handle and plug. These spaces and the chamber are filled with a suitable adhesive or bonding material, indicated generally at 20, which when set, will be a body of substantially H form in axial cross-section. This material provides a tight fit of the handle and the plug 17 in the cooperating surrounding portions 15a and 15b of the socket and the solid central transverse cylindrical portion 20a thereof bonds or connects the extremity 11b of the handle to the extremity 18b of the plug. It will be noted that this portion 20a is located substantially at the junction 15c of the socket portions 15a and 15b.

This arrangement, in effect, makes the handle continuous with the plug 18. This, upward or outward axial movement of the inserted part 11a of the handle will be resisted not only by the lower portion of the handle and its surrounding adhesive or bonding material, but also by the tapered plug 18 which is substantially integrally joined to the handle portion by the solid bonding material connection at 20. The resulting integrally-bonded handle portion extends completely through the socket 15 and has sections with their axes angularly disposed relatively, resulting from the angular disposition of the socket sections 15a and 15b, which further resists outward or upward axial withdrawal of the handle from the socket sleeve.

Figure 5:
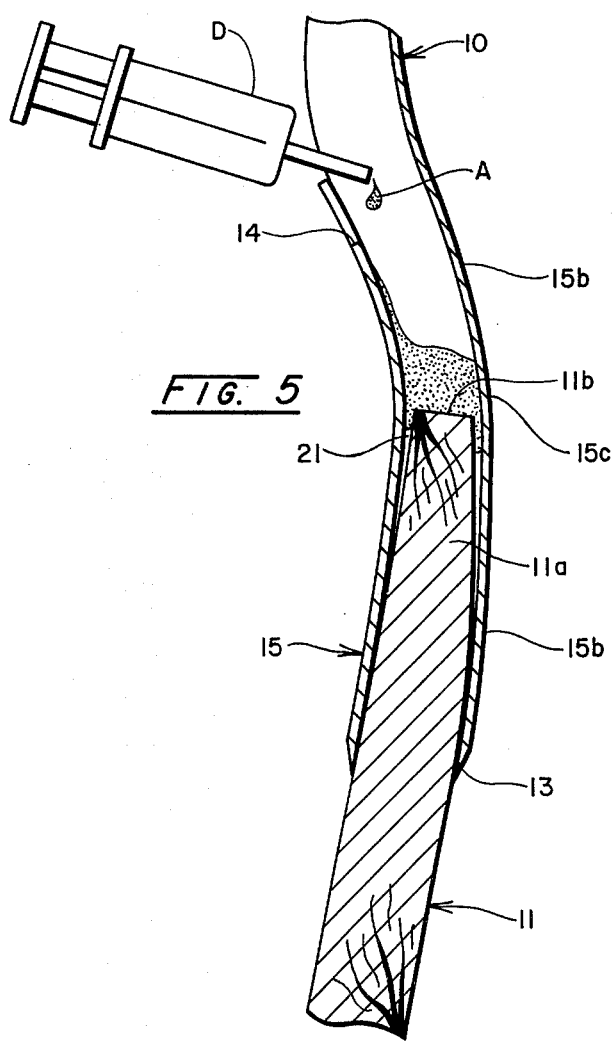
FIG. 5 is a schmatic view showing the adhesive being supplied into the lower end of the socket.
Figure 6:
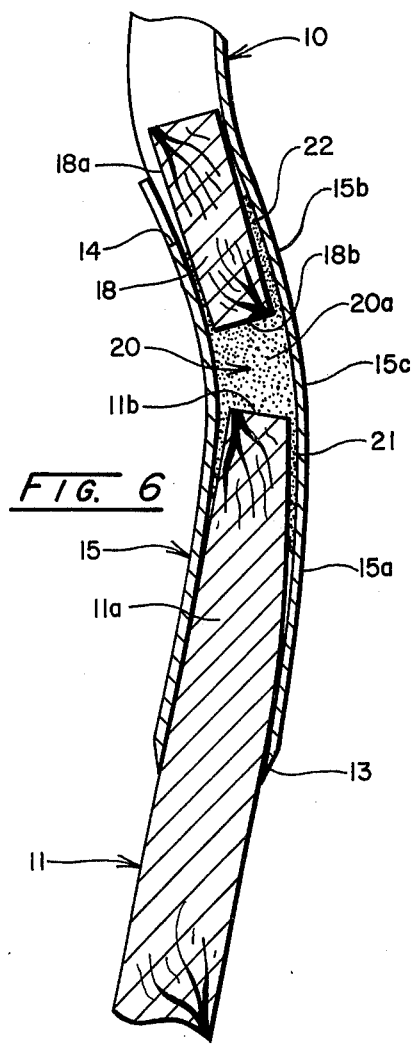
FIG. 6 is a schematic view showing the plug being forced into the lower end of the socket.

The manner in which this structural assembly is produced is illustrated in FIGS. 4 to 6. As indicated in FIG. 4, the lower tapered end portion 11a of the handle is first forced into the flared upper open end of the socket so that its lower extremity is substantially at the joint 15c. During this action the inner portion of the handle may be bent by contact with the wall of the socket 15 at the junction 15c. It will be noted that, at this time, there is a substantially annular space 21 between the inner portion of the tapered end 11a of the handle and the surrounding socket portion 15a but this space is closed at its axial outer end by the tight fit of the handle portion and the surrounding wall of the socket portion 15a adjacent its annular extremity 13.

The next step is illustrated in FIG. 5 where a viscous adhesive A is shown being supplied from a double applicator D into the lower end of the socket 15, the head being tilted upwardly so that the adhesive will not flow out of the lower open end of the socket. This adhesive will flow into the space 21 around the lesser diameter inner end of the handle portion 11a, and a substantial amount will be accumulated over the inner extremity 11b of the handle portion. A preferred bonding material or adhesive is a two-part epoxy resin of the type commonly used for industrial bonding purposes, but other adhesives may be used.

Next, as shown in FIG. 6, a suitable plug 18 is driven or otherwise forced into the lower open end 14 of the socket 15 while the adhesive is still viscous. This plug is preferably of wood but it could be of solid resin or some other suitable material. It is a tapering plug, as indicated, of selected axial extent, the extent of taper being such as to provide the desired smaller diameter at its inner end and the desired greater diameter at its outer end. As the plug is forced into the viscous adhesive accumulated in the socket 15, it is forced inwardly into the substantially annular space 21 surrounding the inserted portion 11a of the handle. Simultaneously, it is forced outwardly around the substantially annular space 22 which is formed between the inner portion of the plug 18 and the surrounding portion of the socket section 15b. Axial inward movement of the plug 18 will be stopped when the plug engages the surrounding socket wall at the outer end 14 thereof with sufficient pressure and, at this time, the inner extremity 18b of the plug will still be spaced axially outwardly from the inner handle extremity 11b. The leading end of the plug may contact the wall of the socket adjacent the junction 15c before it reaches its final position. Thus, all voids around the inserted portions of the handle and the plug, as well as the chamber between the their inner extremities 11b and 18b, are filled with the viscous adhesive.

Forcing the handle end 11a and the plug 18 into the respective upper and lower ends of the sleeve-like socket 15, will not result in spreading of the socket wall due to its welded seam 16. Also, this seam will prevent escape of the viscous adhesive A during the operations of supplying the adhesive and inserting the plug 18.

The adhesive is now allowed to cure or set which will result in the structural assembly previously described consisting of the inserted handle end 11a and the inserted plug 18, joined by an H-shaped section of bonding material, into a continuous handle portion which not only tightly fits within the socket but has tensile strength to resist axial upward displacement out of the handle.

Although this invention is described above specifically with reference to a shovel, it could be embodied in other handtools or implements in which there is a socket open at both ends. The handle is secured in the socket, after insertion of its tapered end in one end of the socket, by the use of visous adhesive applied through the opposite end of the socket, preferably by using the tapered plug which is forced into that end to displace the adhesive to completely fill the space around the inserted end of the handle and plug, and then allowing the adhesive to set to join the inserted plug handle.

Having thus described this invention what is claimed is:

1. A hand implement comprising a head and an elongated handle; said head having a continuous socket formed thereon with an outwardly opening handle-receiving end and an opposite outwardly-opening plug-receiving end, a handle having a portion inserted into the handle-receiving end of the socket to fit tightly therein adjacent the socket outer end but to provide a space around the inserted handle portion within the socket, a plug having a portion inserted into the plug-receiving end of the socket to fit tightly therein adjacent the socket outer end but to provide a space around the inserted plug portion within the socket, said plug inserted portion and said handle inserted portion having inner extremities spaced from each other to provide a chamber therebetween which communicates with the respective spaces around the inserted portions of the plug and handle, said chamber and said spaces being filled with a body of solid bonding material which is of substantially H-form in axial cross-section that bonds to the surrounding socket and the inserted plug and handle portions to substantially integrally connect the plug and handle portions together within the socket and cause them to tightly fit within the socket.

2. A hand implement according to claim 1 in which the head is of metal and the plug and handle are of non-metallic materials, said inserted portion of the handle being tapered relative to the socket to provide the space around it in the socket into which it is forced, said inserted portion of the plug being tapered relative to the socket to provide the space around it in the socket into which it is forced to a position where its inner extremity is spaced from the inner extremity of the handle portion.

3. A hand implement according to claim 2 in which the head is a metal shovel head having a socket formed at its rear side, said socket being of annular sleeve-like form with substantially annular upper and lower extremities forming the handle-receiving and plug-receiving ends respectively, said inserted tapered portion of the handle being of annular form and engaging the annular socket extremity at the upper end of the socket and said inserted tapered plug portion being of annular form and engaging the annular socket extremity at the lower end of the socket so that the spaces around the inserted plug and handle portion are of substantially annular form and open to the chamber therebetween which is of tubular form with the spaces and chamber filled with the bonding material.

4. A hand implement according to claim 3 in which the socket is tapered from its upper handle-receiving end downwardly to its lower plug-receiving end and provides an upper flared socket section and a lower socket section with their axes angularly disposed relatively at an intermediate junction, said bonding material filled chamber being located at said junction.

5. A hand implement according to claim 4 in which the socket is formed on the shovel as a split sleeve which has a welded seam.

6. A hand implement according to claim 5 in which the handle and plug are of wood and the body of bonding material is an epoxy resin.

7. A hand implement according to claim 6 in which the shovel head is made of aluminum with a sharp coined digging edge.

8. A hand implement according to claim 7 in which the upper annular extremity of the socket sleeve is a coined edge which tapers outwardly and downwardly.

9. The method of assembling a hand implement consisting of an implement head, having a continuous socket formed thereon with an outwardly-opening handle-receiving end and an opposite outwardly-opening plug-receiving end, and an elongated handle; which comprises; inserting an end portion of the elongated handle in the handle-receiving end of the socket to fit tightly therein adjacent the socket outer end but to provide a space around the inserted handle portion within the socket; providing a viscous bonding material within the socket through the open plug-receiving end thereof, inserting an end portion of a plug into the plug-receiving end of the socket to fit tightly therein adjacent the socket outer and but to provide a space around the inserted plug portion within the socket and simultaneously forcing the viscous bonding material into the space around the inserted handle portion and around the inserted plug portion but inserting the plug axially to a position so that its inner extremity is spaced from the inner extremity of said inserted handle portion to provide a chamber which is also filled with said viscous bonding material, and allowing the bonding material to set to substantially integrally join the plug and handle portions together within the socket and cause them to tightly fit within the socket.

10. The method of claim 9 in which the inserted portion of the handle is tapered and the inserted portion of the plug is tapered relative to the socket so that spaces are around each in the socket, the spaces opening inwardly to the chamber between the inner extremities of the plug and handle, the spaces and chamber being filled with the viscous bonding material as the plug is inserted into its final position by forcing it into the plug-receiving end of the socket.

11. The method of claim 10 in which the socket is formed on a shovel head as a substantially annular sleeve with a handle-receiving section having an annular outer extremity of selected diameter and plug-receiving section having an annular outer extremity of selected diameter and with their axes angularly disposed at an intermediate junction, the handle portion to be inserted into its socket section is formed as a tapered annular portion which has a diameter at its inner end less than that of the section and a greater diameter at a selected distance axially therefrom for engaging said annular outer extremity thereof, and said plug portion to be inserted into its socket section is formed as a tapered annular plug of selected length which has a diameter at its inner end less than that of the section and a greater diameter at a selected distance axially therefrom for engaging said annular outer extremity thereof so that the plug will be positioned to space the inner extremity thereof from the inner extremity of the inserted portion of the handle to provide said chamber located at said junction of the socket sections which is filled with said bonding material.

12. The method of claim 11 in which the handle and plug are of wood, and the adhesive is a two-part epoxy resin.

* * * * *